(12) United States Patent
Amagi et al.

(10) Patent No.: US 9,755,478 B2
(45) Date of Patent: Sep. 5, 2017

(54) BRUSHLESS MOTOR (71) Applicant: MINEBEA CO., LTD., Nagano (JP)

(72) Inventors: Yuta Amagi, Yonago (JP); Ryoji Saneshige, Yonago (JP); Toshiyuki Nishikata, Yonago (JP)

(73) Assignee: MINEBEA CO., LTD., Nagano (JP)

( * ) Notice: Subject to any disclaimer, the term of this patent is extended or adjusted under 35 U.S.C. 154(b) by 245 days.

(21) Appl. No.: 14/790,415

(22) Filed: Jul. 2, 2015

(65) Prior Publication Data
US 2016/0065017 A1  Mar. 3, 2016

(30) Foreign Application Priority Data

Aug. 29, 2014 (JP) .................. 2014-175851

(51) Int. Cl.
*H02K 1/27* (2006.01)
*H02K 7/106* (2006.01)
*H02K 29/03* (2006.01)
*H02K 21/22* (2006.01)

(52) U.S. Cl.
CPC ............ *H02K 7/106* (2013.01); *H02K 29/03* (2013.01); *H02K 21/22* (2013.01)

(58) Field of Classification Search
CPC ........ H02K 7/106; H02K 29/03; H02K 21/22; H02K 21/27; H02K 21/2786
USPC ........................................ 310/67 R
See application file for complete search history.

(56) References Cited

U.S. PATENT DOCUMENTS

| 6,172,442 B1* | 1/2001 | Jun ........................ H02K 21/24 310/156.26 |
| 2009/0134733 A1* | 5/2009 | Matsubara ............. H02K 7/063 310/156.64 |

FOREIGN PATENT DOCUMENTS

JP     2007-143289 A     6/2007

* cited by examiner

*Primary Examiner* — Naishadh Desai
(74) *Attorney, Agent, or Firm* — Oliff PLC (57) ABSTRACT

The invention provides a brushless motor. A stator 16 of the brushless motor has a stator core 17 provided with a plurality of salient poles 18 arranged in its a circumferential direction, and a winding wire 20 wound around the plurality of salient poles 18 through an insulator 19. A rotor 22 of the brushless motor has a tubular rotor yoke 23 arranged to surround the stator 16, an annular magnet for detent torque 25 arranged in an inner peripheral portion of the winding wire 20 on the stator core 17 and surrounding the shaft 15, and a magnetic member 27 coupled to an interior surface of a ceiling portion of the rotor yoke 23 to be opposed to the magnet for detent torque 25, and surrounding the shaft 15.

7 Claims, 8 Drawing Sheets

BRUSHLESS MOTOR

CROSS-REFERENCE TO RELATED APPLICATIONS

This application claims priority from Japanese Patent Application No. 2014-175851 filed on Aug. 29, 2014, which is incorporated herein by reference.

BACKGROUND OF THE INVENTION

1. Field of the Invention

The present invention relates to a brushless motor.

2. Background of the Invention

Conventionally, studies for increasing detent torque have been done to exactly control a stop position when a motor is not excited. Such a brushless motor being capable of increasing the detent torque is disclosed in, for example, JP 2007-143289(A).

In accordance with the brushless motor as described in JP 2007-143289(A), a pole tooth is formed in a stator yoke, and three types of pole teeth having different areas by varying height and/or width thereof are provided. The detent torque can be increased by shifting or displacing the three types of pole teeth in combination at a predetermined angle.

However, in the afore-mentioned conventional brushless motor configuration, the stator yoke has a direct effect on rotary drive of the motor, and also has a great effect on other properties of the motor. For the above reasons, when the pole tooth is formed in the stator yoke in order to increase the detent torque, rotation torque of the motor is greatly decreased. As a result, even if the detent torque is increased, the original properties of the motor is compromised.

SUMMARY OF THE INVENTION

The present invention is provided for solving the afore-mentioned problems. In other words, the objective of the invention is to provide a brushless motor with simple construction being capable of improving or increasing detent torque thereof without lowering rotation torque thereof.

In accordance with one aspect of the invention, there is provided a brushless motor, which is provided with a base portion; a shaft supported by the base portion; a stator fixed to the base portion to surround the shaft and having a stator core provided with a plurality of salient poles arranged in a circumferential direction thereof, and a winding wire wound around the plurality of salient poles through an insulator; and a rotor coupled to the shaft and having a tubular rotor yoke arranged to surround the stator, an annular magnet for detent torque arranged in an inner peripheral portion of the winding wire on the stator core and surrounding the shaft, and a magnetic member coupled to an interior surface of a ceiling portion of the rotor yoke to be opposed to the magnet for detent torque, and surrounding the shaft. The tubular rotor yoke is provided with a magnet for rotary drive on an inner periphery thereof. The annular magnet for detent torque is magnetized to have a plurality of poles arranged in a circumferential direction thereof. The magnetic member has a plurality of pole teeth arranged in a circumferential direction thereof. A number of the plurality of poles of the magnet for detent torque is equal to a number of the plurality of pole teeth of the magnetic member.

In accordance with another aspect of the invention, there is provided a brushless motor, which is provided with a base portion; a frame together with the base portion to form a case; a shaft supported by the base portion and the frame; a stator fixed to the base portion to surround the shaft, and having a stator core provided with a plurality of salient poles arranged in a circumferential direction thereof, and a winding wire wound around the plurality of salient poles through an insulator; and a rotor coupled to the shaft, and having a tubular rotor yoke arranged to surround the stator, an annular magnet for detent torque arranged in an inner peripheral portion of the winding wire on the stator core and surrounding the shaft, and a magnetic member which the shaft is inserted into and passes through. The tubular rotor yoke is provided with a magnet for rotary drive on an inner periphery thereof. The annular magnet for detent torque is magnetized to have a plurality of poles arranged in a circumferential direction thereof. The magnetic member has a plurality of pole teeth arranged in a circumferential direction thereof, wherein the plurality of pole teeth of the magnetic member is opposed to an inner periphery of the magnet for detent torque. A number of the plurality of poles of the magnet for detent torque is equal to a number of the plurality of pole teeth of the magnetic member.

DETAILED DESCRIPTION OF THE INVENTION

Referring to the accompanying drawings, one embodiment of the present invention will be hereinafter described in detail. Furthermore, the same reference numeral is assigned to the same element or part throughout the overall specification.

First Embodiment 1

Figure 1:
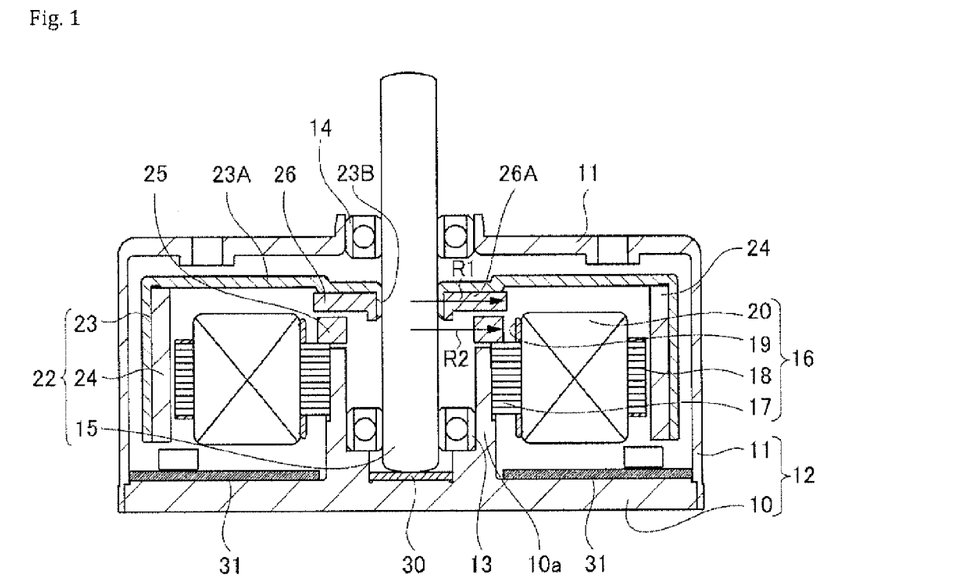
FIG. 1 is a cross-sectional view of a first embodiment of a brushless motor in accordance with the present invention.

FIG. 1 is a cross-sectional view of a first embodiment of a brushless motor in accordance with the present invention.

Referring to FIG. 1, a case 12 of a brushless motor has a base portion 10 and a frame 11 disposed to cover one surface (i.e., an upper surface in FIG. 1) of the base portion 10.

The base portion 10 is disposed at an approximately center portion of the case 12. The base portion 10 is provided with a cylindrical portion 10a, which is integrally formed with the base portion 10. A shaft 15 is rotatably supported by a bearing 13 fixed to an interior of the cylindrical portion 10a and a bearing 14 fixed to the frame 11. The lower end portion of the shaft 15 located adjacent to the base portion 10 is provided with a thrust plate 30. One end portion of the shaft 15 extends beyond the frame 11.

A circuit board 31 is disposed in a bottom surface of the case 12 (in particularly, on the base portion 10), and a stator 16 is fixed to the cylindrical portion 10a of the base portion 10 so as to surround the shaft 15. The stator 16 has a stator core 17 having a salient poles 18 (for example, nine salient poles 18) arranged in a circumferential direction thereof, and a winding wire 20 wound around the salient pole 18 through an insulator 19.

A rotor 22 which is coupled to the shaft 15 is disposed to surround the stator 16. In other words, the rotor 22 has a rotor yoke 23 having a cylindrical shape with one end closed. The shaft 15 is coupled to the closed end 23A (i.e., a ceiling portion) of the rotor yoke 23 along a central axis of the rotor yoke 23. A magnet for rotary drive 24 is disposed on the inner periphery of the rotor yoke 23 and opposed to the stator core 17. The magnet for rotary drive 24 is magnetized such that N pole and S pole are alternated in a circumferential direction of the magnet for rotary drive 24.

Figure 2:
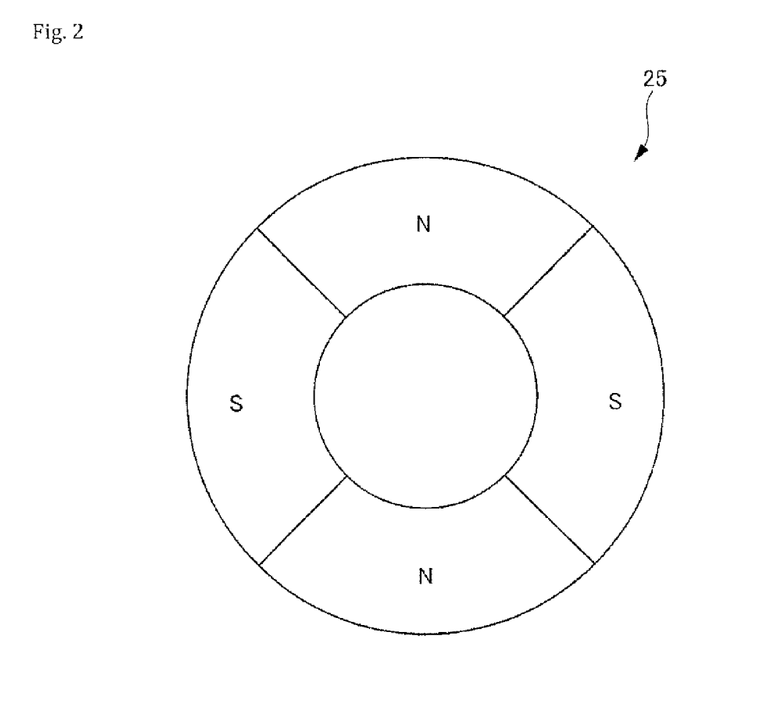
FIG. 2 is a top view of a magnet for detent torque mounted in the brushless motor of FIG. 1.

An annular magnet for detent torque 25 is fixed to the stator core 17 while surrounding the shaft 15. The annular magnet for detent torque 25 is formed of relatively thin plate material. The annular magnet for detent torque 25 is arranged in the inner peripheral portion of the winding wire 20 on the stator core 17. FIG. 2 is a top view of the magnet for detent torque 25, which is magnetized such that a plurality of poles (for example, four poles including N pole, S pole, N pole, and S pole) is arranged in a circumferential direction of the magnet for detent torque 25.

Figure 3A:
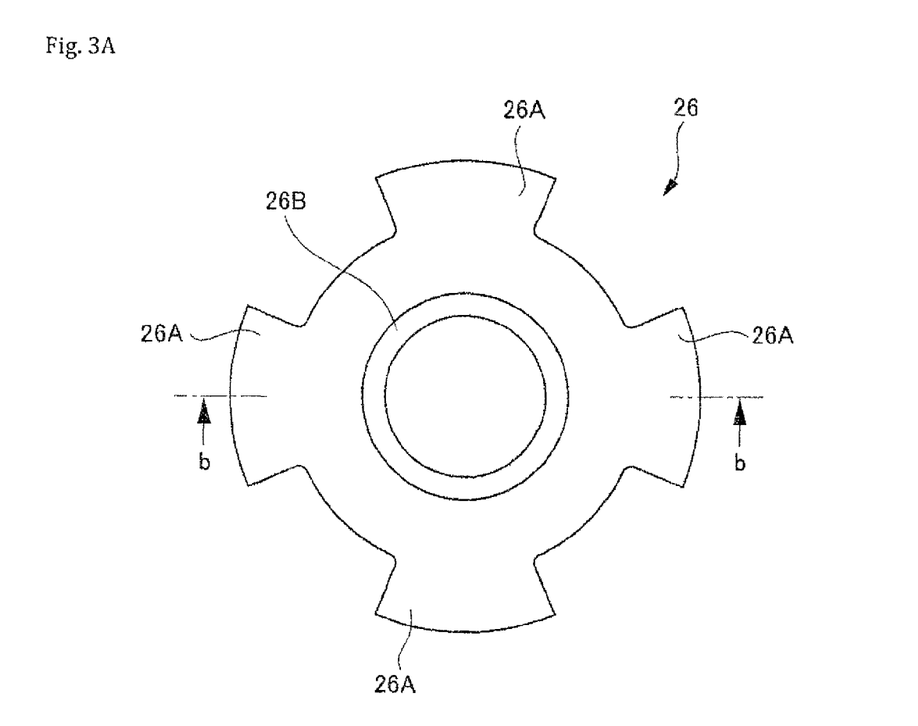
FIG. 3A is a top view of a magnetic member mounted in the brushless motor of FIG. 1.
Figure 3B:
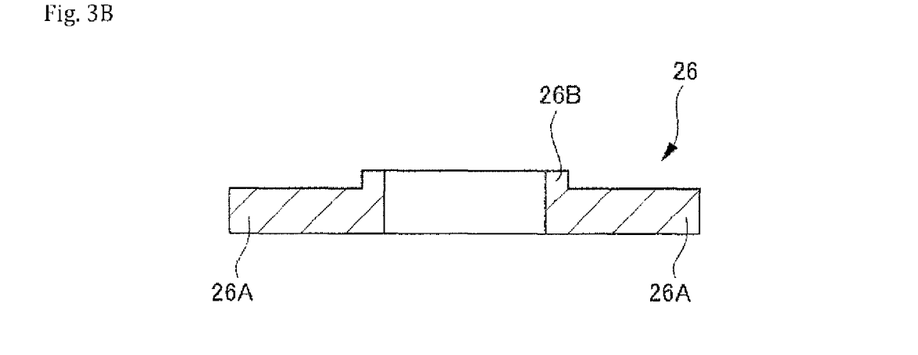
FIG. 3B is a cross-sectional view of a magnetic member mounted in the brushless motor of FIG. 1 along the line b-b in FIG. 3A.

Returning to FIG. 1, a magnetic member 26 surrounding the shaft 15 is coupled to an interior surface of the closed end 23A (i.e., the ceiling portion) of the rotor yoke 23. The magnetic member 26 is formed of relatively thin plate material. Due to this the magnetic member 26 is opposed to the magnet for detent torque 25. FIG. 3A is a top view of the magnetic member 26. In FIG. 3A, four pole teeth 26A are arranged in a circumferential direction, and each of the four pole teeth 26A outwardly or exteriorly extends from the outer periphery. The number of the pole teeth 26A of the magnetic member 26 used corresponds to the number of the poles of the magnet for detent torque 25. In other words, the number of the pole teeth 26A of the magnetic member 26 used is equal to the number of the poles of the magnet for detent torque 25. In a case where the number of the poles of the magnet for detent torque 25 is, for example, six, the number of the pole teeth 26A of the magnetic member 26 is six. Referring to FIG. 3B which is a cross-sectional view of FIG. 3A along the line b-b, the magnetic member 26 has a connecting portion 26B, which is disposed at an inner periphery of the magnetic member 26 and has a thickness greater than that of the pole tooth 26A. Due to this, as shown in FIG. 1, a reliable connection between the connecting portion 26B and a bent portion 2313 which is curved or bent along an axis and in which the rotor yoke 23 is fixed to the shaft 15 can be achieved. Furthermore, as shown in FIG. 1, the magnetic member 26 at the pole tooth 26A section has an outer diameter R 1 greater than an outer diameter R 2 of the magnet for detent torque 25.

Figure 4:
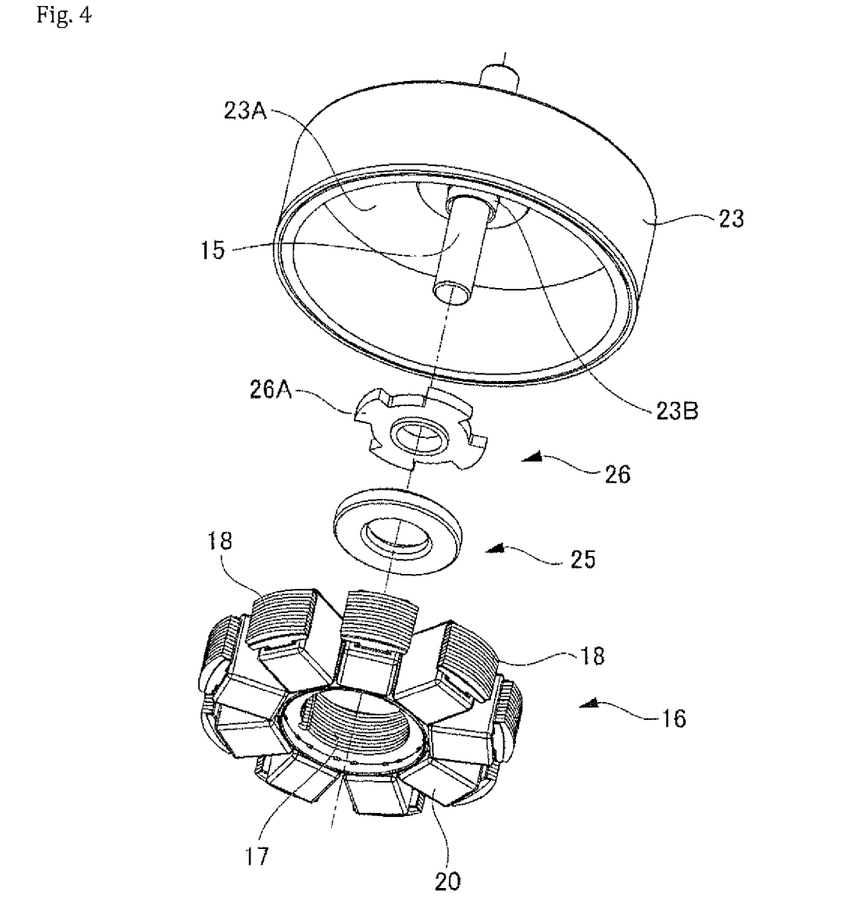
FIG. 4 is a partial exploded perspective view of FIG. 1. A stator, a magnet for detent torque, a magnetic member, and a rotor yoke are shown in FIG. 4.

FIG. 4 is a partial exploded perspective view of FIG. 1. The stator 16, the magnet for detent torque 25, the magnet member 26, and the rotor yoke 23 are shown in FIG. 4. The magnet for detent torque 25 is fixed with respect to the stator 16, and the magnetic member 26 is rotatable with the rotation of the rotor yoke 23. As both of the magnet for detent torque 25 and the magnetic member 26 are formed of relatively thin plate material, the thickness of the brushless motor can be suppressed.

In accordance with the brushless motor as described previously, the neighboring poles of the magnet for detent torque 25 attract each other through the magnetic member 26 when the motor is in a resting state, thereby increasing the detent torque. When applying current onto the winding wire 20 of the motor, a rotation force greater than the detent torque is applied to the motor yoke 23. However, a configuration for rotation and a configuration for detent torque are independent of each other, and thus do not influence each other. For the above reason, the original properties of the motor can be prevented from degradation. As both of the magnet for detent torque 25 and the magnetic member 26 are formed of relatively thin plate material, the thickness of the motor body can be suppressed.

Data values of the detent torques in the inventive brushless motor and the conventional brushless motor are provided in Table 1 as listed below.

TABLE 1

| Sample No. | Comparative Examples direction of rotation | | Exmaples direction of rotation | |
| --- | --- | --- | --- | --- |
| | CW | CCW | CW | CCW |
| 1 | 6 | 16 | 32 | 26 |
| 2 | 7 | 13 | 35 | 22 |
| 3 | 13 | 17 | 42 | 24 |
| 4 | 7 | 12 | 24 | 30 |
| 5 | 6 | 15 | 28 | 28 |
| 6 | 6 | 15 | 28 | 30 |
| 7 | 7 | 20 | 35 | 26 |
| 8 | 8 | 15 | 33 | 30 |
| 9 | 7 | 18 | 44 | 20 |
| 10 | 12 | 17 | 44 | 34 |
| Average | 7.9 | 15.8 | 34.5 | 27.0 |
| Average of CW & CCW | | 11.8 | | 30.8 |
| Difference from Com. Ex. (%) | | | | 260.0 |

In Table 1, the column of "comparative examples" relates to data values of a conventional brushless motor, and the column of "examples" relates to data values of the inventive brushless motor, which is obtained by applying the present invention to the comparative examples (i.e., the conventional brushless motor). For reference, the conventional brushless motor is not provided with the magnet for detent torque as well as the magnetic member as employed in the inventive brushless motor, In Table 1 "CW" means clockwise rotation, and "CCW" means counterclockwise rotation. The number of samples is ten, and an average of the data is also provided. Table 1 demonstrates that in any of the cases the inventive brushless motor produces greater detent torque.

Second Embodiment

Figure 5:
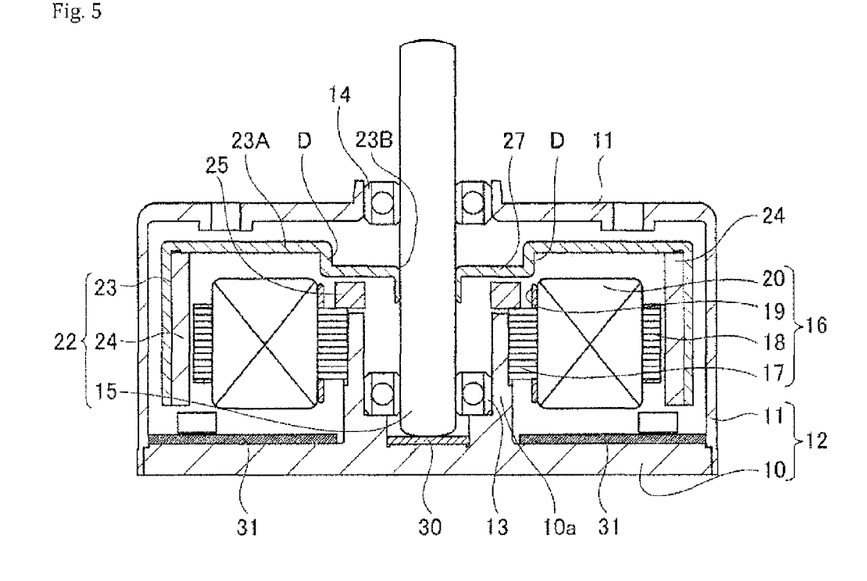
FIG. 5 is a cross-sectional view of a second embodiment of a brushless motor in accordance with the present invention.

FIG. 5 is a cross-sectional view of a second embodiment of a brushless motor in accordance with the present invention, and substantially corresponds to FIG. 1.

Figure 6:
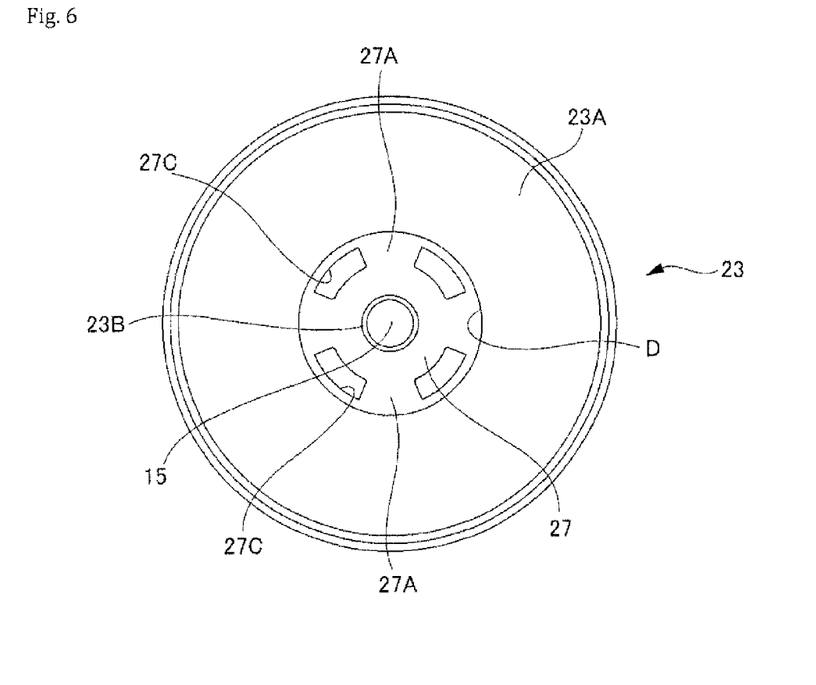
FIG. 6 shows an interior surface of a rotor yoke mounted in the brushless motor of FIG. 5.

The second embodiment as shown in Fig, 5 is substantially equivalent to the first embodiment as shown in FIG. 1 except that a magnetic member 27 is integrally formed with the rotor yoke 23 by a punching process. For reference, in FIG. 1 the magnetic member 26 is formed independently of the rotor yoke 23. As the rotor yoke 23 is formed of magnetic material, it is partially provided with a function as the magnetic member 27. In other words, referring to FIG. 5, a portion of the closed end 23A (i.e., the ceiling portion) of the rotor yoke 23 adjacent to the shaft 15 is stepped (see "D" in FIG. 5) to further approximate the magnet for detent torque 25 with only slight gap between the magnet for detent torque 25 and the portion of the closed end 23A, thereby forming a section or area of the magnetic member 27. Referring to FIG. 6 showing the interior surface of the rotor yoke 23, the section or area of the magnetic member 27 is provided with, for example, four notches 27C, thereby forming four pole teeth 27A. As mentioned previously, the second embodiment in which the magnetic member 27 is integrally formed with the rotor yoke 23 has an effect similar to the first embodiment.

Third Embodiment

Figure 7:
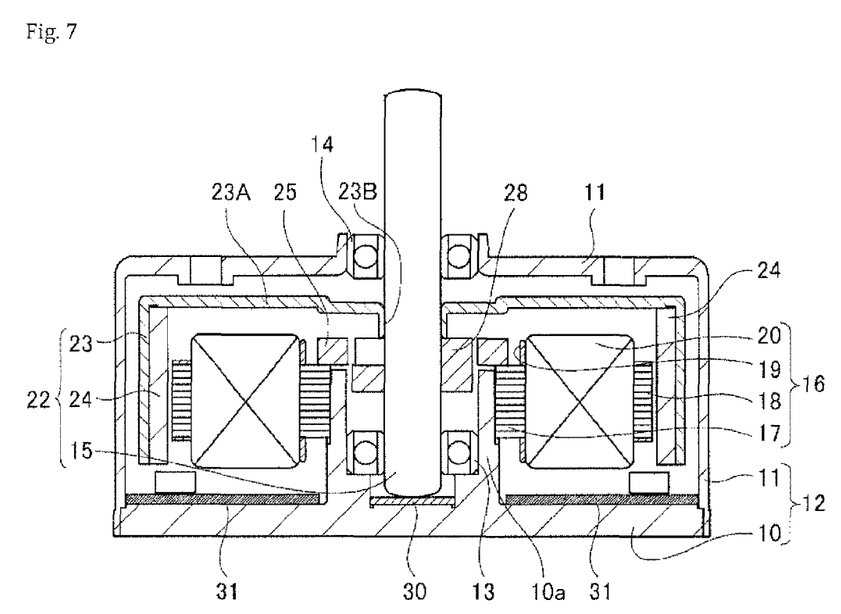
FIG. 7 is a cross-sectional view of a third embodiment of a brushless motor in accordance with the present invention.
Figure 8A:
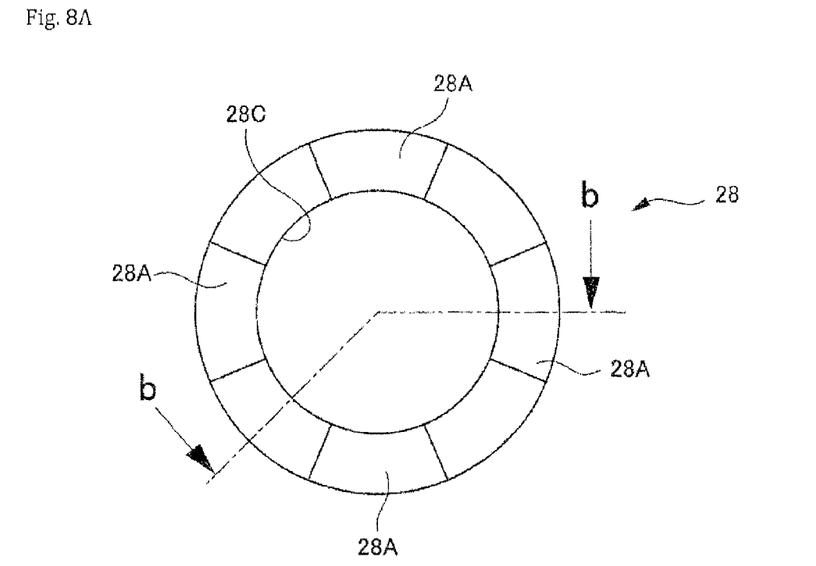
FIG. 8A is a top view of a magnetic member mounted in the brushless motor of FIG. 7.
Figure 8B:
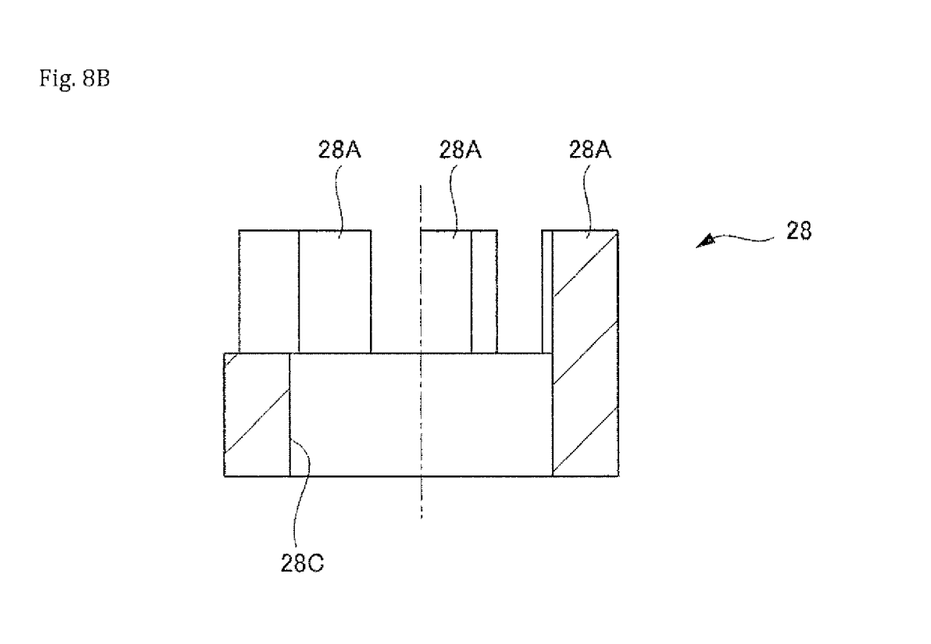
FIG. 8B is a cross-sectional view of a magnetic member mounted in the brushless motor of FIG. 7 along the line b-b.

FIG. 7 is a cross-sectional view of a third embodiment of a brushless motor in accordance with the present invention, and substantially corresponds to FIG. 1, The third embodiment as shown in FIG. 7 is equivalent to the first embodiment as shown in FIG. 1 except for a magnetic member 28. FIG. 8A is a top view of the magnetic member 28 viewed from a pole tooth 28A side, and FIG. 8B is a cross-sectional view of FIG. 8A along the line b-b. Referring to FIG. 8A, the magnetic member 28 has a cylindrical shape provided with a hole 28C for inserting the shaft 15 therein and passing the shaft 15 therethrough arranged in the center thereof, and a pole tooth 28A extending in its axial direction at its one end. For example, four pole teeth 28A may be circumferentially arranged at even intervals. Referring to FIG. 7, the magnetic member 28 coupled to the shaft 15 is disposed such that the pole tooth 28A is opposed to the inner periphery of the magnet for detent torque 25. Furthermore, the magnet for detent torque 25 used in this embodiment has the same configuration as described in the first embodiment.

Figure 9:
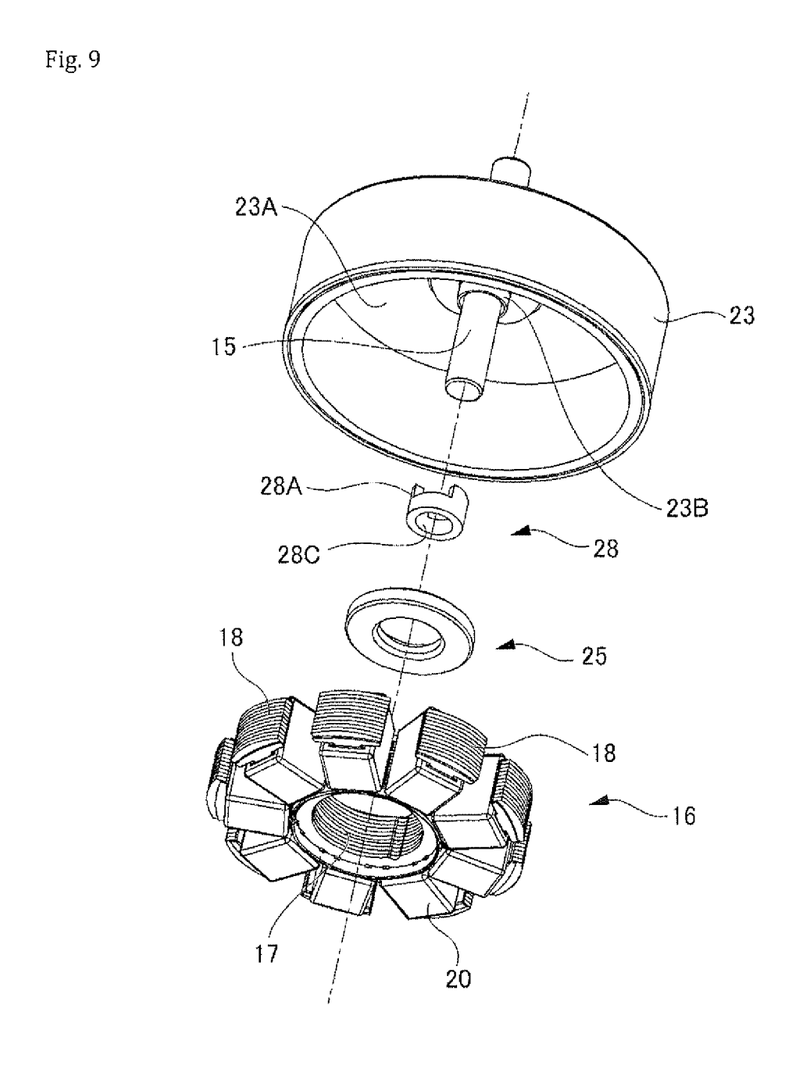
FIG. 9 is a partial exploded perspective view of FIG. 7. A stator, a magnet for detent torque, a magnetic member, and a rotor yoke are shown in FIG. 9.

FIG. 9 is a partial exploded perspective view of FIG. 7. The stator 16, the magnet for detent torque 25, the magnet member 28, and the rotor yoke 23 are shown in FIG. 9. The magnet for detent torque 25 is fixed with respect to the stator 16, and the magnetic member 28 coupled to the shaft 15 is rotatable with the rotation of the rotor yoke 23. In this case, the magnetic member 28 is normally rotatable with the pole tooth 28A opposed to the inner periphery of the magnet for detent torque 25.

Forth Embodiment

Figure 10:
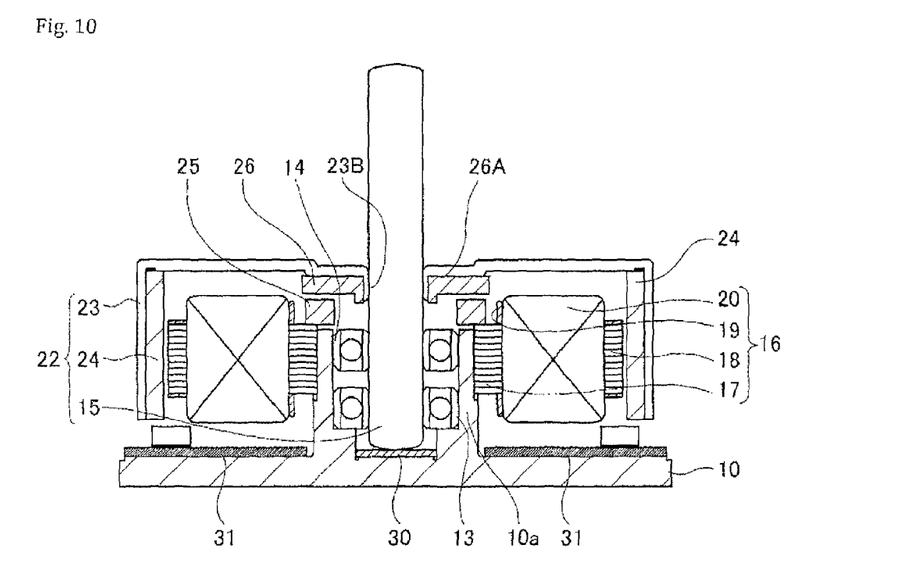
FIG. 10 is a cross-sectional view of a forth embodiment of a brushless motor in accordance with the present invention.

Any of the afore-mentioned embodiments is provided with the frame 11. However, the present invention is not limited to the afore-mentioned embodiments provided with the frame 11. The present invention also includes the configuration as shown in FIG. 10 which is not provided with the frame 11. Referring to FIG. 10, both of the bearing 14 and the bearing 13 are coupled to the base portion 10. In other words, the bearing 13 and the bearing 14 are coupled to the base portion 10 with being aligned perpendicularly to the base portion 10. Due to this, even if there is not the frame 11, the shaft 15 supported by the bearing 13 and bearing 14 are reliably supported by the base portion 10 alone.

Fifth Embodiment

Figure 11:
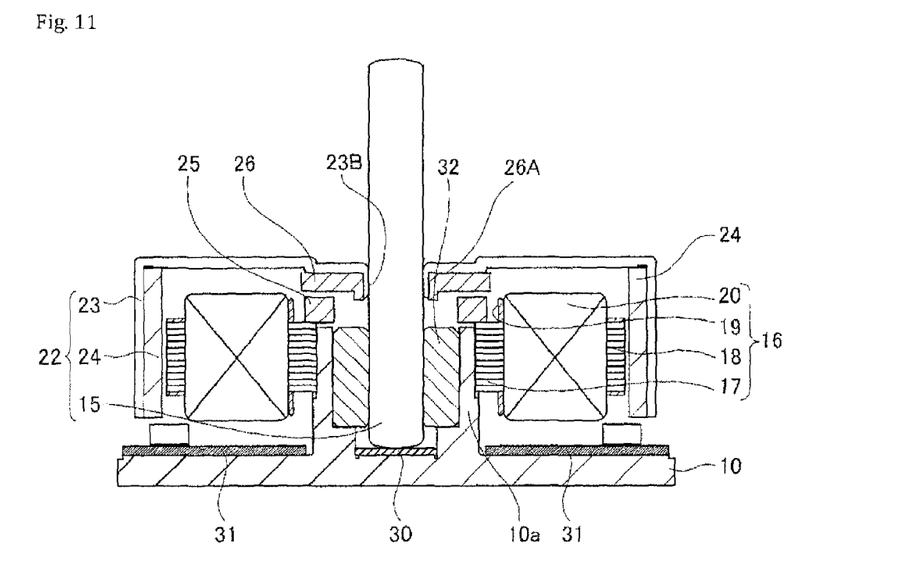
FIG. 11 is a cross-sectional view of a fifth embodiment of a brushless motor in accordance with the present invention.

While the afore-mentioned embodiments employ two ball bearings, the present invention is not limited to the afore-mentioned embodiments employing two ball bearings. A fifth embodiment as shown in FIG. 11 employs a slide bearing 32 instead of the bearing 13 and the bearing 14 as employed in the forth embodiment. Due to the slide bearing 32 a support area can be secured in an axial direction, thereby sufficiently supporting the shaft 15.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the instant invention should be limited only by the appended claims.

The invention claimed is:
1. A brushless motor, comprising
a base portion;
a shaft supported by the base portion;
a stator fixed to the base portion to surround the shaft, the stator having a stator core provided with a plurality of salient poles arranged in a circumferential direction thereof, and a winding wire wound around the plurality of salient poles through an insulator; and
a rotor coupled to the shaft, the rotor having a tubular rotor yoke arranged to surround the stator, an annular magnet for detent torque arranged in an inner peripheral portion of the winding wire on the stator core and surrounding the shaft, and a magnetic member coupled to an interior surface of a ceiling portion of the rotor yoke to be opposed to the magnet for detent torque, and surrounding the shaft, wherein the tubular rotor yoke is provided with a magnet for rotary drive on an inner periphery thereof, wherein the annular magnet for detent torque is magnetized to have a plurality of poles arranged in a circumferential direction thereof, wherein the magnetic member has a plurality of pole teeth arranged in a circumferential direction thereof, and wherein a number of the plurality of poles of the magnet for detent torque is equal to a number of the plurality of pole teeth of the magnetic member.

2. The brushless motor according to claim 1, wherein the magnetic member at a section where each of the pole teeth is formed has an outer diameter greater than an outer diameter of the magnet for detent torque.

3. The brushless motor according to claim 1, wherein the magnetic member has a connecting portion arranged in an inner periphery thereof, and the plurality of pole teeth exteriorly extending from an outer periphery thereof.

4. The brushless motor according to claim 2, wherein the magnetic member has a connecting portion arranged in an inner periphery thereof, and the plurality of pole teeth exteriorly extending from an outer periphery thereof.

5. The brushless motor according to claim 1, wherein the magnetic member is formed together with the plurality of pole teeth during a punching process of the rotor yoke.

6. The brushless motor according to claim 2, wherein the magnetic member is formed together with the plurality of pole teeth during a punching process of the rotor yoke.

7. A brushless motor, comprising
a base portion;
a frame together with the base portion to form a case;

a shaft supported by the base portion and the frame;
a stator fixed to the base portion to surround the shaft, the stator having a stator core provided with a plurality of salient poles arranged in a circumferential direction thereof, and a winding wire wound around the plurality of salient poles through an insulator; and
a rotor coupled to the shaft, the rotor having a tubular rotor yoke arranged to surround the stator, an annular magnet for detent torque arranged in an inner peripheral portion of the winding wire on the stator core and surrounding the shaft, and a magnetic member which the shaft is inserted into and passes through, wherein the tubular rotor yoke is provided with a magnet for rotary drive on an inner periphery thereof, wherein the annular magnet for detent torque is magnetized to have a plurality of poles arranged in a circumferential direction thereof, wherein the magnetic member has a plurality of pole teeth arranged in a circumferential direction thereof, wherein the plurality of pole teeth of the magnetic member is opposed to an inner periphery of the magnet for detent torque, and wherein a number of the plurality of poles of the magnet for detent torque is equal to a number of the plurality of pole teeth of the magnetic member.

* * * * *